Figures 1, 2:
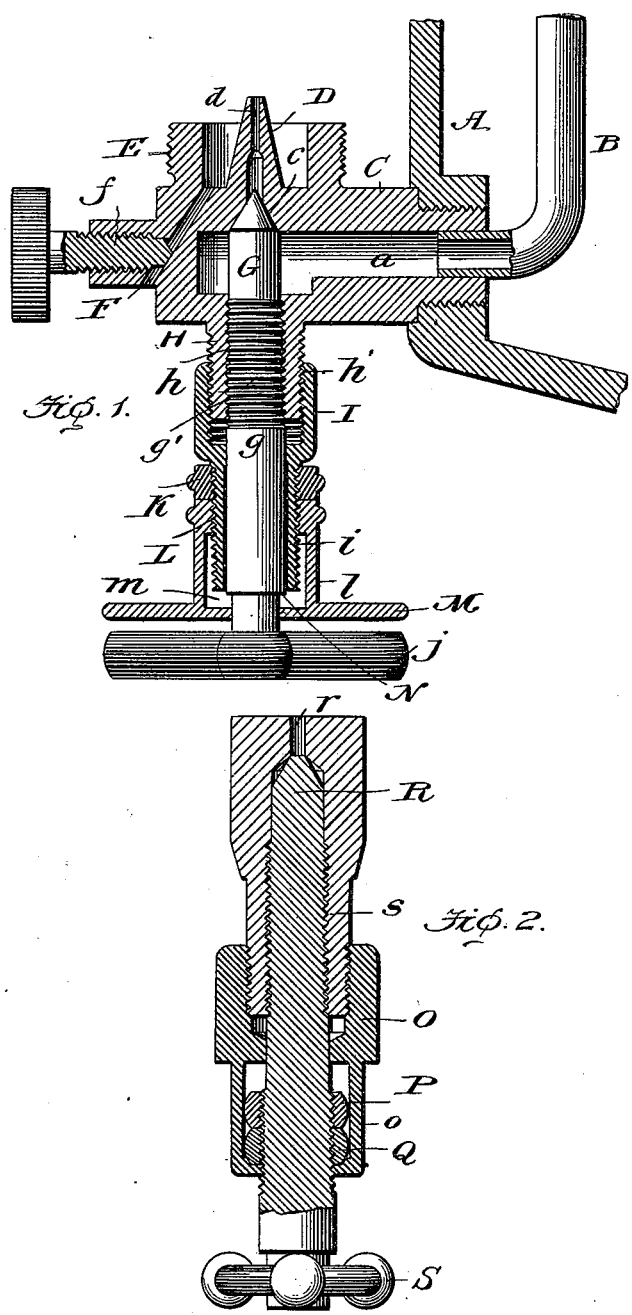

No. 675,204. Patented May 28, 1901.
F. W. EDWARDS.
LUBRICATOR FEED REGULATOR.
(Application filed Mar. 20, 1901.)
(No Model.)

Witnesses

Inventor
Frank W. Edwards.
By E. K. Bond
Attorney

UNITED STATES PATENT OFFICE.

FRANK W. EDWARDS, OF LOGANSPORT, INDIANA.

LUBRICATOR-FEED REGULATOR.

SPECIFICATION forming part of Letters Patent No. 675,204, dated May 28, 1901.

Application filed March 20, 1901. Serial No. 52,069. (No model.)

*To all whom it may concern:*

Be it known that I, FRANK W. EDWARDS, a citizen of the United States, residing at Logansport, in the county of Cass and State of Indiana, have invented certain new and useful Improvements in Lubricator-Feed Regulators, of which the following is a specification, reference being had therein to the accompanying drawings.

This invention relates to certain new and useful improvements in lubricators, and more especially pertains to the feed-regulators therefor.

The invention has for its objects, among others, to provide a simple, cheap, yet durable and most efficient device for regulating the travel of the valve-stem, to make provision for the adjustment of the parts, and to insure a predetermined amount of flow of the lubricant, so that such amount of flow is assured until readjustment is made. By my construction the travel of the valve can be regulated to permit a certain amount of the oil to escape, so that after the device has been once regulated to any predetermined quantity of flow of the lubricant it requires no more attention from the engineer—that is, whenever the engine is to lubricated it is only necessary for the engineer to turn the valve-stem and the predetermined quantity of oil will flow. The engineer can shut off the lubricator at night or at any other time and open it again at the same fixed distance, so as to insure a flow of a predetermined quantity of the lubricant. I go further in this connection and provide a construction whereby both an adjusted and a full-open feed are provided, in connection with an assured and positive means of locking it when set to a fine feed.

Other objects and advantages of the invention will hereinafter appear, and the novel features thereof will be particularly pointed out in the appended claims.

The invention is clearly illustrated in the accompanying drawings, which, with the letters of reference marked thereon, form a part of this specification, and in which—

Figure 1 is a substantially central vertical section with parts in elevation, showing my improved adjustable feed-valve and its connections with the lubricator. Fig. 2 is a substantially central longitudinal section through another embodiment of the invention.

Like letters of reference indicate like parts in both views.

Referring now to the details of the drawings by letter, A designates a portion of the wall of the lubricator, of known construction, of which B is the oil-delivery pipe, communicating with the passage $a$ in the feed-arm C, which in this instance is shown as the lower feed-arm threaded into a suitable opening in the wall of the lubricator and provided with a valve-seat $c$, controlling the outlet of the oil or lubricant through the opening $d$ in the cone D. E is the nipple for attachment of the sight-feed, and F is a drain-passage controlled by the valve $f$, all these parts being of any well-known or approved form of construction in lubricators.

G is the valve, fitted to the valve-seat $c$ to control the flow of the oil through the delivery-opening $d$, and the valve-stem $g$ is threaded for a portion of its length, as seen at $g'$, and has threaded engagement in the threaded bore $h$ of the nipple H, depending from the feed-arm, as clearly seen in Fig. 1. This nipple is exteriorly threaded, as shown at $h'$, and is threaded into the upper enlarged portion of the nut I, which nut is provided with the threaded extension $i$, through the bore of which works the unthreaded portion of the valve-stem. The valve-stem is provided with a suitable handle or analogous means $j$, by which it may be turned, as illustrated.

K is a jam-nut threaded onto the threaded extension $i$ of the nut I, as illustrated, and L is another jam-nut, likewise threaded upon the extension $i$ of the nut I beneath the nut K, and this latter nut L has the extended sleeve $l$, which is recessed, as shown, so as to be out of engagement with the extension of the nut I, and the lower end of this extended sleeve terminates in or is provided with the handle M and the stop $m$. The valve-stem $g$ near its lower end, within the sleeve of the nut L, is reduced or otherwise constructed to form a stop-shoulder N, as clearly illustrated in Fig. 1.

The operation of the parts just described is as follows: Supposing the valve to have been set so as to make a slight opening and the engineer desires to open the valve wide for a while, he grasps the handles $j$ and M and turns them together until the required amount of oil is let out. He then turns both of the said handles up until the nut L comes in contact with the jam-nut K, which forms a lock. The valve-stem $g$ is then turned down until the stop-shoulder N comes in contact with the stop $m$, which brings the parts back to the same adjustment that was had before the valve was opened wide. It will thus be seen that while I can adjust the parts to permit of the flow of any predetermined amount of oil and insure the flow of such amount at any and all times until the parts are readjusted I also provide for the opening of a valve to admit of a greater flow at any time when desired and then again restore the parts to their normal position to allow of the flow of the first predetermined amount.

In Fig. 2 I have shown another form of embodiment of the invention so far as pertains to the adjustment for a flow at all times of a predetermined amount of the lubricant. In this figure the nut O is provided with the extended sleeve $o$, within which sleeve are the jam-nut P, the equivalent of the jam-nut K in the form shown in Fig. 1, and the jam-nut Q, the equivalent of the nut L seen in said figure. The valve R in this form controls the flow of oil through the discharge-opening $r$, and the valve-stem is provided with a suitable handle or turning means S and is threaded into the lower part of the extension-sleeve of the nut O, while its upper end is threaded into the extension $s$ from the lower feed-arm. The operation is as follows: The nuts P and Q are adjusted so as to allow of a predetermined amount of movement of the valve-stem to unseat the valve to permit of the flow of a predetermined amount of the lubricant, and this amount of flow is assured at all times until the parts are readjusted, as they may readily be, as will be clearly understood, to increase or decrease the flow of the lubricant.

It will be seen that I have devised a simple, cheap, yet reliable and efficient means for regulating the feed-valve and the feed, and while the embodiments of my invention as hereinbefore disclosed are what I consider at the present time to be preferable I do not wish to be understood as limiting myself to the details herein illustrated, but reserve the right to make such changes, variations, and modifications as may come clearly within the scope of my invention and the protection prayed.

What is claimed as new is—

1. In a lubricator-feed regulator, the combination of a valve, a nut having an extension, a valve-stem movable therethrough, and independent jam-nuts, with a coöperating stop device, as and for the purpose specified.

2. In a lubricator-feed regulator, a valve, a nut having an extension, a valve-stem movable through said extension, and jam-nuts interposed between the first-mentioned nut and the lower end of the extension, and a coöperating stop device, substantially as described.

3. In a lubricator-feed regulator, a valve, a valve-casing, a valve-stem threaded through an extension of the casing, a nut having a depending sleeve, a stop device and independently-movable jam-nuts, as and for the purpose set forth.

4. In a lubricator-feed regulator, the combination of a valve, a valve-casing, a nut adjustable on an extension of the casing, and two independent jam-nuts interposed between the extension of the casing and the lower end of the valve-stem, and a coöperating stop device, substantially as described.

5. In a lubricator-feed regulator, the combination of a valve, a valve-casing having an extension, a nut adjustable on said extension and having a depending sleeve, and independent jam-nuts interposed between said nut and the lower end of the sleeve, and a coöperating stop device, as set forth.

6. In a lubricator-feed regulator, the combination of a valve and a valve-casing having a threaded extension, a nut threaded on said extension and having a depending sleeve, a jam-nut on the sleeve, a valve-stem having a stop-shoulder and an independent jam-nut also on said sleeve and limited in its movement by the first-mentioned jam-nut and a stop coöperating with said shoulder, substantially as described.

7. In a lubricator-feed regulator, the combination of a valve, a valve-casing having a depending threaded sleeve, a nut adjustable thereon and having a depending sleeve, a jam-nut on said sleeve, and an independent jam-nut on said sleeve beneath the first-mentioned jam-nut, and a coöperating stop device, the lowermost jam-nut and the valve-stem having handles adapted to be simultaneously actuated, substantially as described.

8. In a lubricator-feed regulator, the combination of a valve, a valve-casing having a threaded extension, a nut screwed on said extension and having a depending screw-threaded sleeve, a jam-nut adjustable on said sleeve, and an independent jam-nut also adjustable on said sleeve and having a depending portion provided with a handle, and a valve-stem having a handle adapted to be grasped simultaneously with the handle of the lowermost jam-nut and provided with a shoulder serving as a stop in conjunction with a portion of the handle of the lowermost jam-nut, substantially as described.

In testimony whereof I affix my signature in presence of two witnesses.

FRANK W. EDWARDS.

Witnesses:
GEORGE M. DICKSON,
THERON A. DUFFEY.